United States Patent
Kim et al.

(10) Patent No.: US 10,023,669 B2
(45) Date of Patent: Jul. 17, 2018

(54) OLEFIN-BASED POLYMER

(71) Applicant: LG CHEM, LTD., Seoul (KR)

(72) Inventors: Hyo Ju Kim, Daejeon (KR); Ji Yoon Woo, Daejeon (KR); Sang Eun Park, Daejeon (KR); Young Woo Lee, Daejeon (KR); Choong Hoon Lee, Daejeon (KR); Hae Woong Park, Daejeon (KR); Ik Je Choe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/500,859

(22) PCT Filed: Mar. 23, 2016

(86) PCT No.: PCT/KR2016/002938
§ 371 (c)(1),
(2) Date: Jan. 31, 2017

(87) PCT Pub. No.: WO2016/153275
PCT Pub. Date: Sep. 29, 2016

(65) Prior Publication Data
US 2017/0218105 A1 Aug. 3, 2017

(30) Foreign Application Priority Data

Mar. 26, 2015 (KR) .................. 10-2015-0042743
Feb. 24, 2016 (KR) .................. 10-2016-0021825

(51) Int. Cl.
*C08F 110/00* (2006.01)
*C08F 210/16* (2006.01)
*C08F 4/76* (2006.01)

(52) U.S. Cl.
CPC ............. *C08F 210/16* (2013.01); *C08F 4/76* (2013.01); *C08F 2500/03* (2013.01); *C08F 2500/08* (2013.01)

(58) Field of Classification Search
CPC ..... C08F 2500/08; C08F 2500/03; C08F 4/76
See application file for complete search history.

(56) References Cited

U.S. PATENT DOCUMENTS 5,064,802 A 11/1991 Stevens et al.
5,539,076 A 7/1996 Nowlin et al.
(Continued)

FOREIGN PATENT DOCUMENTS

EP 2 374 822 A2 10/2011
JP 2008-260954 A 10/2008
(Continued)

OTHER PUBLICATIONS

Chen et al., "A Novel Phenolate "Constrained Geometry" Catalyst System. Efficient Synthesis, Structural Characterization, and α-Olefin Polymerization Catalysis", Organometallics 1997, 16, pp. 5958-5963.
(Continued)

*Primary Examiner* — Richard A Huhn
(74) *Attorney, Agent, or Firm* — Birch, Stewart, Kolasch & Birch, LLP

(57) ABSTRACT

The present invention relates to an olefin-based polymer exhibiting a single peak when analyzed by gel permeation chromatography (GPC), and having three elution temperatures Te1, Te2 and Te3 when measuring temperature rising elution fractionation (TREF) at a temperature ranging from −20° C. to 120° C. Accordingly, the olefin-based polymer having excellent mechanical strength, and in particular, significantly improved impact strength is provided.

10 Claims, 5 Drawing Sheets

(56) References Cited

U.S. PATENT DOCUMENTS

| | | |
|---|---|---|
| 6,548,686 B2 | 4/2003 | Nabika et al. |
| 2003/0139546 A1 | 7/2003 | Jain et al. |
| 2004/0158011 A1 | 8/2004 | Jain et al. |
| 2013/0203949 A1 | 8/2013 | Lee et al. |
| 2015/0011770 A1 | 1/2015 | Lee et al. |
| 2015/0290571 A1 | 10/2015 | Koch et al. |
| 2016/0046735 A1 | 2/2016 | Lee et al. |
| 2016/0068667 A1 | 3/2016 | Demirors et al. |
| 2016/0272743 A1 | 9/2016 | Park et al. |

FOREIGN PATENT DOCUMENTS

| | | | |
|---|---|---|---|
| KR | 10-0986301 B1 | 10/2010 | |
| KR | 10-1249995 B1 | 4/2013 | |
| WO | WO 99/14271 A1 | 3/1999 | |
| WO | WO 2014/111123 A1 | 7/2014 | |
| WO | WO-2014159844 A1 * | 10/2014 | .......... C08L 23/0815 |
| WO | WO 2015/046705 A1 | 4/2015 | |

OTHER PUBLICATIONS

Christie et al., "Novel Routes to Bidentate Cyclopentadienyl-Alkoxide Complexes of Titanium: Synthesis of ($\eta$5-$\sigma$-$C_5R^1_4CHR^2CH_2CR^3R^4O$)$TiCl_2$", Organometallics 1999, 18, pp. 348-359.

Gibson et al., "Advances in Non-Metallocene Olefin Polymerization Catalysis", Chem. Rev. 2003, 103, pp. 283-315.

Gielens et al., "Titanium Hydrocarbyl Complexes with a Linked Cyclopentadienyl-Alkoxide Ancillary Ligand; Participation of the Ligand in an Unusual Activation of a (Trimethylsilyl)methyl Group", Organometallics 1998, 17, pp. 1652-1654.

International Search Report for PCT/KR2016/002938 (PCT/ISA/210) dated Jun. 24, 2016.

Nifant'ev et al., "Zirconium and hafnium complexes based on 2-aryl-8-arylaminoquinoline ligands: synthesis, molecular structure, and catalytic performance in ethylene copolymerization", Dalton Transactions, 2013, 42, pp. 1501-1511.

Rau et al., "Synthesis and application in high-pressure polymerization of a titanium complex with a linked cyclopentadienyl-phenoxide ligand", Journal of Organometallic Chemistry 608 (2000), pp. 71-75.

Stephan et al., "Phosphinimides as a Steric Equivalent to Cyclopentadienyl: An Approach to Ethylene Polymerization Catalyst Design", Organometallics 1999, 18, pp. 1116-1118.

Turner et al., "Facile resolution of constrained geometry indenyl-phenoxide ligation", Chem. Commun., 2003, pp. 1034-1035.

Zhang et al., "Constrained Geometry Tetramethylcyclopentadienyl-phenoxytitanium Dichlorides: Template Synthesis, Structures, and Catalytic Properties for Ethylene Polymerization", Organometallics 2004, 23, pp. 540-546.

European Search Report for Appl. No. 16769093.2 dated Aug. 16, 2017.

* cited by examiner

OLEFIN-BASED POLYMER

CROSS-REFERENCE TO RELATED APPLICATIONS

This application claims priority to and the benefits of Korean Patent Application No. 10-2015-0042743, filed with the Korean Intellectual Property Office on Mar. 26, 2015, and Korean Patent Application No. 10-2016-0021825, filed with the Korean Intellectual Property Office on Feb. 24, 2016 the entire contents of which are incorporated herein by reference.

TECHNICAL FIELD

The present invention relates to an olefin-based polymer having excellent mechanical strength, in particular significantly improved impact strength.

BACKGROUND ART $[Me_2Si(Me_4C_5)NtBu]TiCl_2$ (Constrained-Geometry Catalyst, hereinafter, will be abbreviated as CGC) was reported by Dow Co. in the early 1990s (U.S. Pat. No. 5,064,802), and excellent aspects of the CGC in the copolymerization reaction of ethylene and alpha-olefin may be summarized in the following two points when compared to commonly known metallocene catalysts.

(1) At a high polymerization temperature, high activity is shown and a polymer having high molecular weight is produced, and (2) the copolymerization degree of alpha-olefin having large steric hindrance such as 1-hexene and 1-octene is excellent.

Meanwhile, a copolymer prepared by using the CGC catalyst includes a small amount of a low molecular weight part and may have improved physical properties such as strength, etc. when compared to a copolymer prepared by using a common Zeigler-Natta catalyst.

However, despite the above-described merits, the copolymer prepared by using the CGC catalyst has the defects of deteriorating processability when compared to the polymer prepared by using the common Zeigler-Natta catalyst.

U.S. Pat. No. 5,539,076 discloses a metallocene/non-metallocene blend catalyst system for preparing a specific bimodal copolymer having high density. The catalyst system is supported on an inorganic support. A supported Zeigler-Natta catalyst and a metallocene catalyst system has a drawback that a supported hybrid catalyst has lower activity than a homogeneous single catalyst, and the preparation of an olefin-based polymer having appropriate properties according to use is difficult. In addition, since the olefin-based polymer is prepared in a single reactor, gel that may be generated during the performing of a blending method may be produced, the insertion of a comonomer in a high molecular weight part may be difficult, the shape of a produced polymer may be poor, two polymer components may not be mixed homogeneously, and the control of quality may be difficult.

Thus, the development of an olefin-based polymer that may overcome the drawbacks of a common olefin-based polymer and provide improved physical properties is still required.

DISCLOSURE OF THE INVENTION

Technical Problem

An aspect of the present invention is to provide an olefin-based polymer having excellent mechanical strength, in particular significantly improved impact strength by control of crystal structure in a polymer and a preparing method thereof.

Technical Solution

According to an aspect of the present invention, there is provided an olefin-based polymer which exhibits a single peak when analyzed by gel permeation chromatography (GPC), and comprises three elution temperatures, Te1 (Elution temperature 1), Te2 (Elution temperature 2) and Te3 (Elution temperature 3) when measuring temperature rising elution fractionation (TREF) at a temperature ranging from −20° C. to 120° C.

Advantageous Effects

An olefin-based polymer of the present invention exhibits a single peak when analyzed by gel permeation chromatography (GPC), and comprises three elution temperatures, i.e., Te1, Te2 and Te3 when measuring temperature rising elution fractionation (TREF) by control of crystal structure in a polymer. Accordingly, the olefin-based polymer has excellent mechanical strength, in particular significantly improved impact strength. As a result, it may be used in various fields and applications such as various packing, building, household goods such as materials for an automobile, an electric wire, a toy, a fiber, a medical, etc.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
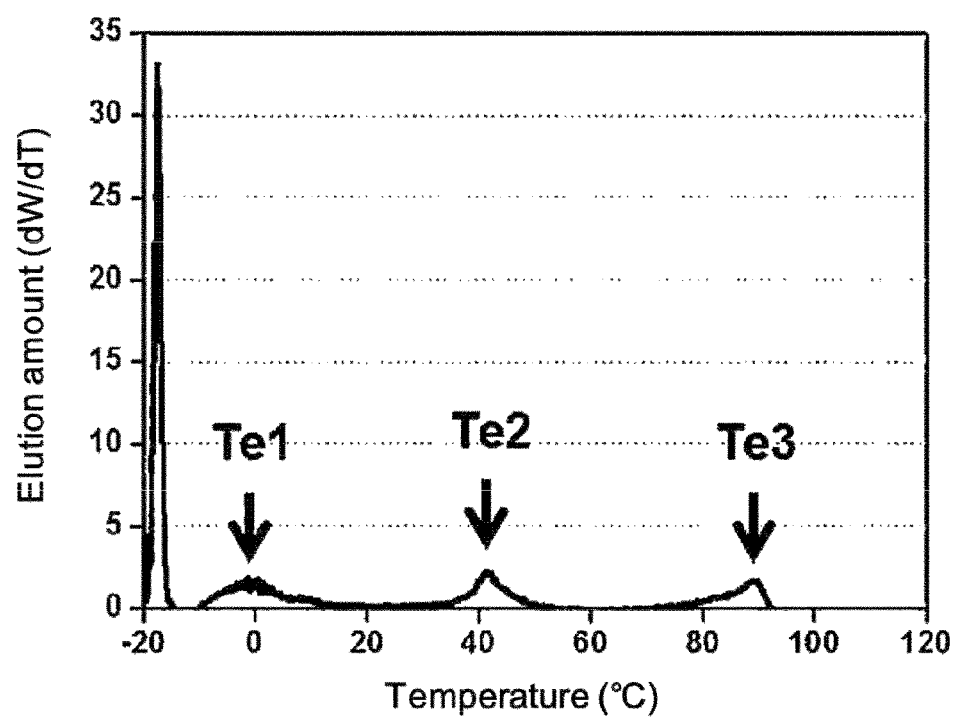
FIG. 1 illustrates a TREF graph of an olefin-based polymer prepared in Example 1.
Figure 2:
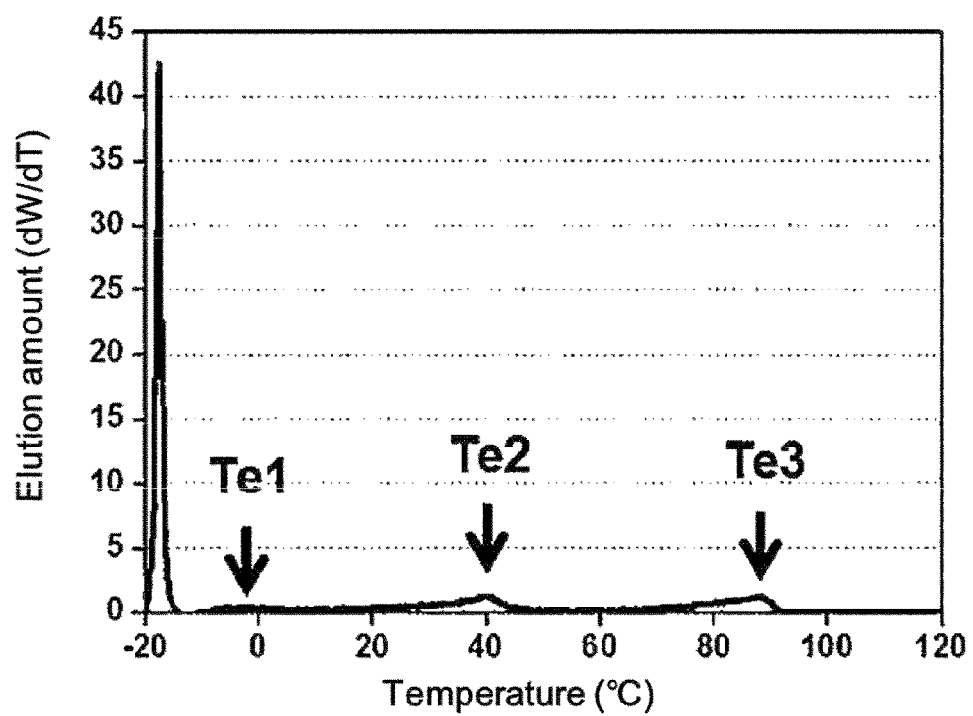
FIG. 2 illustrates a TREF graph of an olefin-based polymer prepared in Example 2.
Figure 3:
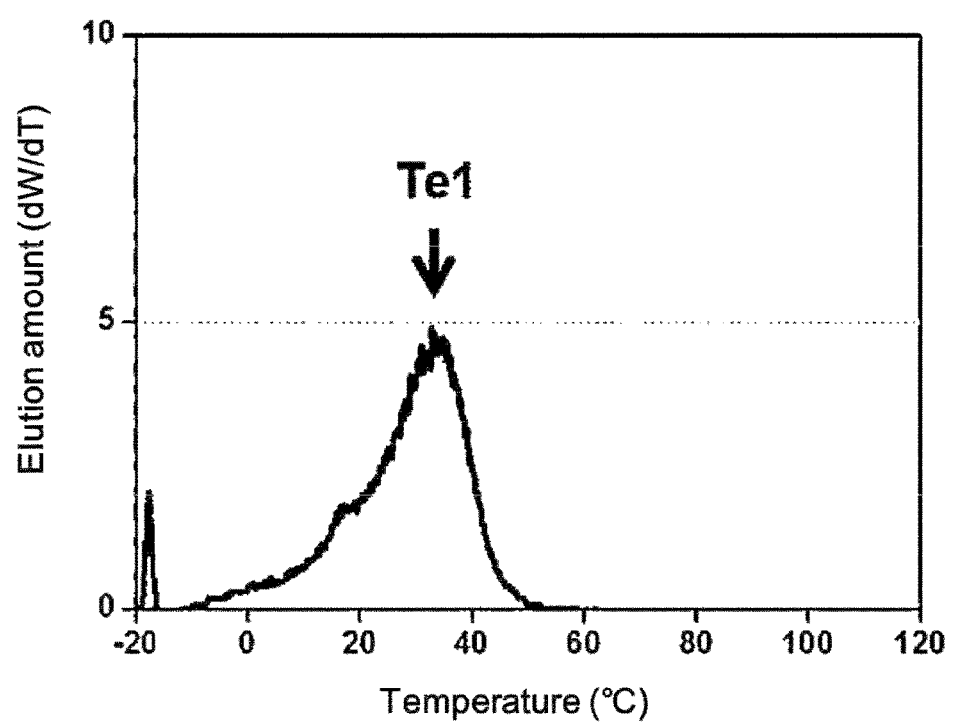
FIG. 3 illustrates a TREF graph of an olefin-based polymer prepared in Comparative Example 1.
Figure 4:
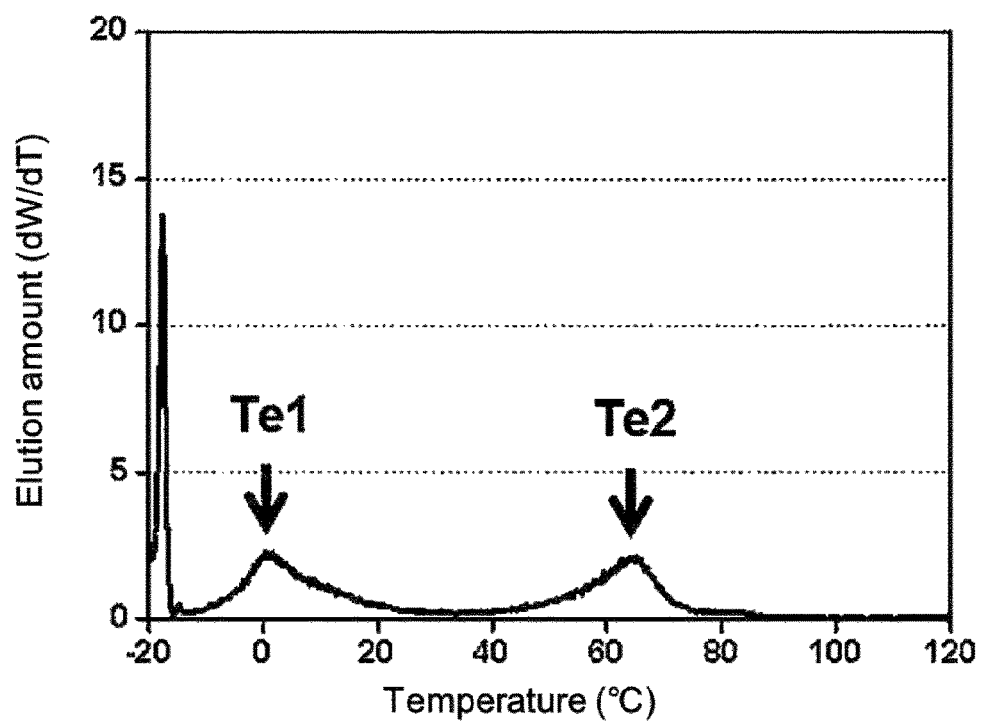
FIG. 4 illustrates a TREF graph of an olefin-based polymer prepared in Comparative Example 4.

Hereinafter, the present invention will be described in more detail in order to illuminate the present invention.

Terms or words used in the present application and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

In the present application, unless otherwise stated or indicated, the term "alkyl" used herein denotes either a linear or branched aliphatic saturated hydrocarbon containing from 1 to 20 carbon atoms. Specifically, the alkyl comprises a linear or branched alkyl group containing from 1 to 20 carbon atoms, more specifically from 1 to 6 carbon atoms. Representative examples of the alkyl group include, but are not limited to, methyl, ethyl, n-propyl, isopropyl, n-butyl, isobutyl, sec-butyl, t-butyl, pentyl, iso-amyl or hexyl.

In addition, in the present application, unless otherwise stated or indicated, the term "alkoxy" used here in denotes either a linear or branched alkyl group having from 1 to 20 carbon atoms bonded with oxygen atom (—OR). Specifically, the alkoxy comprises alkoxy group containing from 1 to 20 carbon atoms, more specifically from 1 to 6 carbon atoms. Representative examples of the alkoxy group include, but are not limited to, methoxy, ethoxy, propoxy, butoxy, or, t-butoxy.

In addition, in the present application, unless otherwise stated or indicated, the term "alkenyl" used here in denotes either a linear or branched aliphatic unsaturated hydrocarbon having from 2 to 20 carbon atoms containing carbon-carbon double bond. Specifically, the alkenyl comprises an alkenyl group containing from 2 to 6 carbon atoms. Representative examples of the alkenyl group include, but are not limited to, ethenyl, propenyl or butenyl.

In addition, in the present application, unless otherwise stated or indicated, the term "cycloalkyl" used here in denotes cyclic unsaturated hydrocarbon having from 3 to 20 carbon atoms. Specifically, the cycloalkyl comprises a cycloalkyl group containing from 3 to 6 carbon atoms. Representative examples of the cycloalkyl group include, but are not limited to, cyclopropyl, cyclobutyl or cyclohexyl.

In addition, in the present application, unless otherwise stated or indicated, the term "aryl" used here in denotes carbocycle aromatic radical having from 6 to 20 carbon atoms, which contains one or more rings. The rings may be attached or fused together by a pendant method. Specifically, the aryl comprises an aryl group containing from 6 to 20 carbon atoms, more specifically from 6 to 12 carbon atoms. Representative examples of the aryl group include, but are not limited to, phenyl, naphtyl or biphenyl.

In addition, in the present application, unless otherwise stated or indicated, the term "arylalkyl" used here in denotes a functional group (Ar—R—) in which an aryl group (Ar) as an aromatic hydrocarbon group is substituted with a carbon of a linear or branched alkyl group (R). Specifically, the arylalkyl comprises an arylalkyl group containing from 7 to 20 carbon atoms, more specifically from 7 to 12 carbon atoms. Representative examples of the arylalkyl group include, but are not limited to, benzyl, phenethyl.

In addition, in the present application, unless otherwise stated or indicated, the term "alkylaryl" used here in denotes a functional group (R—Ar—) in which a linear or branched alkyl group (R) is substituted with a carbon of an aromatic hydrocarbon group (Ar). Specifically, the alkylaryl comprises an alkylaryl group containing from 7 to 20 carbon atoms, more specifically from 7 to 12 carbon atoms.

In addition, in the present application, unless otherwise stated or indicated, the term "aryloxy" used here in denotes an aryl group bonded with oxygen atom (—O—Ar), wherein the aryl has the same meaning as defined above. Specifically, the aryloxy comprises an aryloxy group containing from 6 to 20 carbon atoms, more specifically from 6 to 12 carbon atoms. Representative examples of the aryloxy group include, but are not limited to, phenoxy.

In addition, in the present application, unless otherwise stated or indicated, the term "silyl" used here in denotes an —$SH_3$ radical derived from silane, and at least one of the hydrogen atoms in the silyl group may be substituted with various organic groups such as an alkyl group or a halogen group.

In addition, in the present application, unless otherwise stated or indicated, the term "alkylamino" used here in denotes a functional group in which at least one hydrogen in the amino group (—$NH_2$) is substituted with an alkyl group, wherein the alkyl has the same meaning as defined above. Specifically, the alkylamino comprises —$NR_2$ (wherein, R may be a hydrogen atom or a linear or branched alkyl group having from 1 to 20 carbon atoms, but not both of R's are hydrogen atoms).

In addition, in the present application, unless otherwise stated or indicated, the term "arylamino" used here in denotes a functional group in which at least one hydrogen in the amino group (—$NH_2$) is substituted with an aryl group, wherein the aryl has the same meaning as defined above.

In addition, in the present application, unless otherwise stated or indicated, the term "alkylidene group" used here in denotes a divalent aliphatic hydrocarbon group in which two hydrogen atoms have been removed from the same carbon atom of an alkyl group. Specifically, the alkylidene group comprises an alkylidene group having from 1 to 20 carbon atoms, more specifically from 1 to 12 carbon atoms. Representative examples of the alkylidene group include, but are not limited to, propan-2-yllidene.

In addition, in the present application, unless otherwise stated or indicated, the term "hydrocarbyl group" used here in denotes a monovalent hydrocarbon group having from 1 to 60 carbon atoms, which consists solely of carbon and hydrogen, regardless of its structure, such as an alkyl group, an aryl group, an alkenyl group, an alkylaryl group, and an arylalkyl group. The term "hydrocarbylene group" used here in denotes a divalent hydrocarbon group having from 1 to 60 carbon atoms.

In addition, in the present application, unless otherwise stated or indicated, the term "metalloid radical" denotes a metalloid radical of a Group 14 (4A) metal substituted with a hydrocarbyl group having from 1 to 20 carbon atoms. The metalloid radical is electronically unsaturated and may act as a Lewis acid. The Group 14 metal may be silicon (Si), germanium, tin, arsenic, or the like. Specifically, the metalloid radical may be a silyl group such as trimethylsilyl, triethylsilyl, ethyldimethylsilyl or methyldiethylsilyl; triphenylgermyl or trimethylgermyl, and the like.

In the present application, the term "a polymer" denotes a polymer compound prepared by the polymerization of monomers having the same or different types. The general term "the polymer" includes "a hybrid polymer" as well as "a homopolymer," "a copolymer" and "a tercopolymer". "The hybrid polymer" denotes a polymer prepared by the polymerization of at least two different types of monomers. The general term "the hybrid polymer" denotes "the copolymer" (commonly used for denoting a polymer prepared using two different types of monomers) and "the tercopolymer" (commonly used for denoting a polymer prepared using three different types of monomers). "The hybrid polymer" includes a polymer prepared by the polymerization of at least four different types of monomers.

In the present application, the term "semi-crystalline" designates a polymer having a first transition temperature measured by TREF, differential scanning calorimetry (DSC), or other equivalent technique, a crystalline melting point (Tm), an elution point, etc. The density, the Tm, the elution point, etc. of the quasicrystal may be dependent on the crystallinity thereof. The term "amorphous" designates a polymer having no crystalline melting point when measured by TREF, DSC, or other equivalent technique.

An olefin-based polymer of the present invention exhibits a single peak when analyzed by gel permeation chromatography (GPC), and comprises three elution temperatures, Te1, Te2 and Te3 when measuring temperature rising elution fractionation (TREF) at a temperature ranging from −20° C. to 120° C.

Generally, when two or more hybrid catalysts are used, there may be two Te as the TREF peak. However, in this case, since it is difficult to predict and control the activity and the copolymerization of each of the hybrid catalysts, it may be difficult to prepare an olefin polymer having properties suitable for the application. Further, the two or more kinds of catalyst components are not uniformly mixed, and quality control may become difficult.

In this regard, since the present invention uses a catalyst composition comprising a heterogeneous transition metal compound excellent in miscibility in the production of an olefin polymer to control a crystal structure in a polymer, a single peak may be exhibited when analyzed by gel permeation chromatography (GPC), and three elution temperatures, Te1, Te2, and Te3 may be exhibited when measuring temperature rising elution fractionation (TREF). Accordingly, an olefin-based polymer having excellent mechanical strength, and in particular, significantly improved impact strength may be provided.

Specifically, the olefin-based polymer according to an embodiment of the present invention comprises a first semi-crystalline olefin-based polymer, a second semi-crystalline olefin-based polymer and a third semi-crystalline olefin-based polymer, and have a peak for the first semi-crystalline olefin-based polymer (P1), a peak for the second semi-crystalline olefin-based polymer (P2) and a peak for the third semi-crystalline olefin-based polymer (P3) in a temperature range from −20° C. to 120° C. Elution temperature (Te) of each peak may be expressed by Te1, Te2 and Te3, respectively.

A common olefin-based polymer has one semi-crystalline peak; however the olefin-based polymer according to an embodiment of the specification may have three semi-crystalline peaks, thereby increasing mechanical properties, etc.

The measuring of the TREF in the specification may be conducted by using, for example, a TREF apparatus of PolymerChar Co. and using an o-dichlorobenzene solvent while elevating the temperature from −20° C. to 120° C.

Specifically, when measuring TREF with respect to the olefin-based polymer, the Te1 may be present at a relatively lower temperature than the Te2, and the Te2 may be present at a relatively lower temperature than the Te3. When the density of the olefin-based polymer is in a range from 0.850 g/cc to 0.910 g/cc, Te1 may be in a range from −20° C. to 100° C.; Te2 may be in a range from 0° C. to 120° C.; and Te3 may be in a range from 20° C. to 120° C. The Te used in the present specification means the temperature at the highest point of each peak in a TREF elution graph expressed by an elution amount with respect to temperature (dW/dT), and a fraction ratio may be calculated as an integration value of a temperature-elution amount graph.

More specifically, according to another embodiment, when measuring TREF when the density of the olefin-based polymer is in a range from 0.86 g/cc to 0.88 g/cc, the Te1 may be in a range from −20° C. to 30° C.; the Te2 may be in a range from 10° C. to 80° C.; and the Te3 may be in a range from 40° C. to 120° C.

According to another embodiment, when measuring TREF, the fraction ratio of the peak for the first semi-crystalline olefin-based polymer (P1) may be from 5% to 90%; the fraction ratio of the peak for the second semi-crystalline olefin-based polymer (P2) may be from 5% to 90%; and the fraction ratio of the peak for the third semi-crystalline olefin-based polymer (P3) may be from 5% to 90%. More specifically, the fraction ratio of the peak for the first semi-crystalline olefin-based polymer (P1) may be from 30% to 80%; the fraction ratio of the peak for the second semi-crystalline olefin-based polymer (P2) may be from 5% to 40%; and the fraction ratio of the peak for the third semi-crystalline olefin-based polymer (P3) may be from 5% to 50%.

For the calculation of the fraction ratio, the initiation point of each peak in the graph of an elution amount with respect to the temperature (dW/dT) is defined as a point initiating the elution of the polymer on the basis of a base line, and the end point of each peak is defined as a point terminating the elution of the polymer on the basis of the base line. In the case that the peak for the first semi-crystalline olefin-based polymer (P1) and the peak for the second semi-crystalline olefin-based polymer (P2) may be partially overlapped, a point where an elution amount value (dW/dT) may be the lowest in an overlapped area may be defined as the terminal point of the P1 peak and as the initiation point of the P2 peak. In addition, a peak exhibited at a temperature range from −20° C. to −10° C. may be shown by the blending of an amorphous polymer and a low crystalline polymer, and the peak exhibited at this position may be treated by adding to the fraction ratio of the P1 peak.

In addition, the olefin-based polymer according to an embodiment may comprise Tc1, Tc2 and Tc3, which are crystallization temperatures Tc obtained in a differential scanning calorimetry (DSC) curve. Specifically, in the density range of the olefin-based polymer from 0.850 g/cc to 0.910 g/cc, the Tc1 may be 5° C. or lower; Tc2 may be in a range from 0° C. to 60° C.; and the Tc3 may be in a range from 80° C. to 130° C.

When a polymer is prepared using a common metallocene catalyst, one Tc is present. However, when three Tc's are present, crystal may be melted and crystallized at different temperatures, and thermal stability and mechanical strength may increase. In the present application, Tc means the peak of the cooling curve of the heat flow in the temperature-heat flow graph of the differential scanning calorimeter (DSC), that is, the exothermic peak temperature during cooling. Specifically, the Tc may be obtained by using a differential scanning calorimeter 6000 (DSC) manufactured by PerkinElmer, and measured with the peak of the cooling curve of the heat flow as a Tc after raising the temperature of a sample (about 0.5 mg to 10 mg of the sample filled in a measuring container) from 0° C. to 150° C. at a rate of 20° C./min in order to make the thermal history of the measurement sample equal, maintaining the temperature for 2 minute, then lowering the temperature from 150° C. to −100° C. at a rate of 10° C./min.

The olefin polymer according to an embodiment of the present invention exhibits a low density of 0.850 g/cc to 0.910 g/cc when measured according to ASTM D-792.

Commonly, the density of the olefin-based polymer is affected by the type and content of the monomers used in the polymerization and the degree of polymerization. The copolymer is affected significantly by the content of the comonomer. In the present invention, it is possible to introduce a large amount of comonomer by mixing a heterogeneous catalyst having a characteristic structure. As a result, the olefin-based polymer according to an embodiment of the present invention has a low density in the range as described above, and as a result, the olefin-based polymer according to an embodiment of the present invention may exhibit excellent impact strength. More specifically, the olefin-based polymer may have a density of 0.86 g/cc to 0.88 g/cc. In this case, an effect of improving a mechanical property and impact strength is more significant by the density control.

In addition, the olefin-based polymer according to an embodiment of the present invention may have melting index (MI) when measured under the conditions of 190° C. and 2.16 kg weight according to ASTM D1238, from 0.1 g/10 min to 100 g/10 min, specifically from 0.1 g/10 min to 50 g/10 min, and more specifically from 0.1 g/10 min to 30 g/10 min.

In addition, the melt index (MI), which affects the mechanical properties, impact strength and moldability of the olefin-based polymer, may be controlled by controlling the amount of catalyst used in the polymerization process. The olefin-based polymer according to an embodiment of the present invention may exhibit an excellent impact strength because the melt index (MI) measured at the low density condition as described above satisfies the above range.

In addition, when two or more kinds of polymers are mixed, the molecular weight distribution (MWD) is usually increased, and as a result, impact strength and mechanical properties are decreased, and blocking phenomenon occurs. In this regard, since the olefin-based polymer according to an embodiment of the present invention uses a heterogeneous catalyst having a characteristic structure, it may have a monomodal single peak in the molecular weight distribution curve in the GPC measurement and a narrow molecular weight distribution even though it has at least three crystallization temperatures on the DSC curve. As a result, excellent impact strength may be exhibited. Specifically, the olefin-based polymer may have a molecular weight distribution (MWD) of 1.5 to 4.0, specifically 1.5 to 3.0, which is a ratio (Mw/Mn) of a weight average molecular weight (Mw) to a number average molecular weight (Mn). In addition, the olefin-based polymer may have a weight average molecular weight (Mw) of 10,000 g/mol to 500,000 g/mol, more specifically 20,000 g/mol to 200,000 g/mol within the above-mentioned molecular weight distribution range.

In the present invention, the weight average molecular weight (Mw) and the number average molecular weight (Mn) are the molecular weight as reduced into polystyrene analyzed by gel permeation chromatography (GPC).

More specifically, an olefin-based polymer according to an embodiment of the present invention may satisfy all of the following requirements (1) to (4):

(1) Density: from 0.850 g/cc to 0.910 g/cc
(2) Melt index (MI) when measured under the conditions of 190° C. and 2.16 kg weight: from 0.1 g/10 min to 100 g/10 min,
(3) Molecular weight distribution (MWD): from 1.5 to 4.0
(4) Comprising three elution temperatures Te1, Te2 and Te3 of the olefin-based polymer when measuring temperature rising elution fractionation (TREF) at a temperature ranging from −20° C. to 120° C.

Thus, by satisfying all the conditions of density, melt index, MWD, and elution temperature, it may exhibit more excellent impact strength characteristics.

More specifically, an olefin-based polymer according to an embodiment of the present invention may have density of from 0.86 g/cc to 0.88 g/cc; melting index (MI) of from 0.1 g/10 min to 30 g/10 min when measured under the conditions of 190° C. and 2.16 kg weight; and molecular weight distribution (MWD) of 1.5 to 3.0. Further, when measuring TREF, the Te1 may be in a range from −20° C. to 30° C.; the Te2 may be in a range from 10° C. to 80° C.; the Te3 may be in a range from 40° C. to 120° C.; the fraction ratio of the peak for the first semi-crystalline olefin-based polymer (P1) may be from 30% to 80%; the fraction ratio of the peak for the second semi-crystalline olefin-based polymer (P2) may be from 5% to 40%; and the fraction ratio of the peak for the third semi-crystalline olefin-based polymer (P3) may be from 5% to 50%.

The olefin-based polymer satisfying the above-described properties may exhibit excellent mechanical strength, particularly excellent impact strength. Therefore, it is useful for blow molding, extrusion molding, or injection molding in various fields and applications such as various packaging, building, household goods such as materials for automobiles, electric wires, toys, fibers, medical supplies, and the like.

The olefin-based polymer may be prepared by polymerizing an olefin-based monomer using a catalyst composition comprising a transition metal compound of the following Formula 1 and a transition metal compound of the following Formula 2. According to another embodiment of the present invention, there is provided a preparing method for the olefin-based polymer.

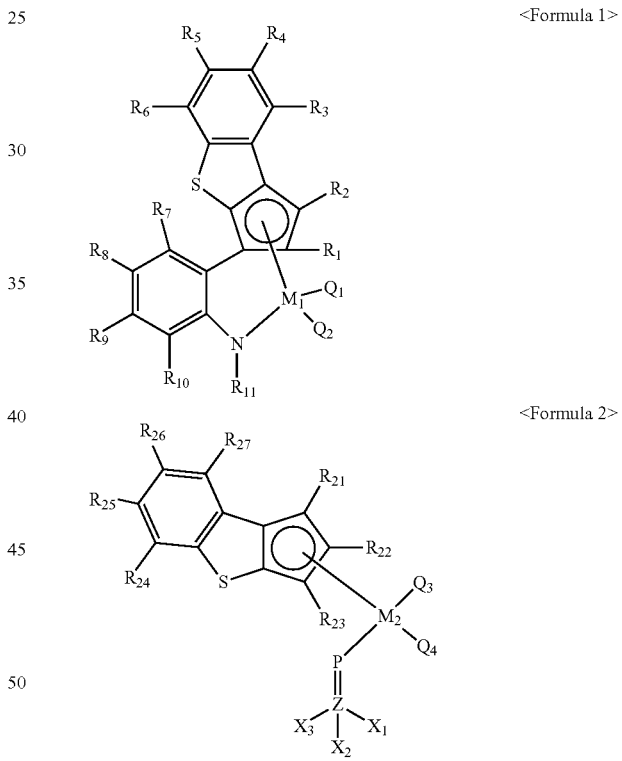

In the above Formula 1 and 2, $M_1$ and $M_2$ are each independently a transition metal in group 4, $Q_1$, $Q_2$, $Q_3$ and $Q_4$ are each independently selected from the group consisting of hydrogen, halogen, alkyl having 1 to 20 carbon atoms, alkenyl having 2 to 20 carbon atoms, cycloalkyl having 3 to 20 carbon atoms, aryl having 6 to 20 carbon atoms, alkylaryl having 7 to 20 carbon atoms, arylalkyl having 7 to 20 carbon atoms, alkyl amido having 1 to 20 carbon atoms, aryl amido having 6 to 20 carbon atoms, and alkylidene having 1 to 20 carbon atoms;

$R_1$ to $R_6$ are each independently selected from the group consisting of hydrogen, halogen, alkyl having 1 to 20 carbon atoms, alkenyl having 2 to 20 carbon atoms, cycloalkyl having 3 to 20 carbon atoms, aryl having 6 to 20 carbon atoms, alkylaryl having 7 to 20 carbon atoms, arylalkyl having 7 to 20 carbon atoms, and a metalloid radical of a metal in group 14 substituted with hydrocarbyl having 1 to 20 carbon atoms; or two or more of $R_1$ to $R_6$ adjacent to each other may be linked to each other to form an aliphatic ring having 5 to 20 carbon atoms or an aromatic ring having 6 to 20 carbon atoms; the aliphatic ring or the aromatic ring may be substituted with halogen, alkyl having 1 to 20 carbon atoms, alkenyl having 2 to 20 carbon atoms or aryl having 6 to 20 carbon atoms;

$R_7$ to $R_{11}$ are each independently selected from the group consisting of hydrogen, halogen, amino, alkyl amino (having 1 to 20 carbon atoms), alkyl having 1 to 20 carbon atoms, alkenyl having 2 to 20 carbon atoms, cycloalkyl having 3 to 20 carbon atoms, aryl having 6 to 20 carbon atoms, alkylaryl having 7 to 20 carbon atoms, arylalkyl having 7 to 20 carbon atoms, and a metalloid radical of a metal in group 14 substituted with hydrocarbyl having 1 to 20 carbon atom; or at least two adjacent to each other of $R_7$ to $R_{11}$ may be connected to each other to form an aliphatic ring having 5 to 20 carbon atoms or an aromatic ring having 6 to 20 carbon atoms; the aliphatic ring or the aromatic ring may be substituted with halogen, alkyl having 1 to 20 carbon atoms, alkenyl having 2 to 20 carbon atoms or aryl having 6 to 20 carbon atoms;

$R_{21}$ to $R_{27}$ are each independently selected from the group consisting of hydrogen, halogen, hydrocarbyl having 1 to 20 carbon atoms, hetero hydrocarbyl having 1 to 20 carbon atoms, and a metalloid radical of a metal in group 14 substituted with hydrocarbyl having 1 to 20 carbon atom; specifically, $R_{21}$ to $R_{27}$ are each independently selected from the group consisting of hydrogen, halogen, silyl, alkyl having 1 to 20 carbon atoms, alkenyl having 2 to 20 carbon atoms, cycloalkyl having 3 to 20 carbon atoms, aryl having 6 to 20 carbon atoms, alkylaryl having 7 to 20 carbon atoms, arylalkyl having 7 to 20 carbon atoms, and a metalloid radical of a metal in group 14 substituted with hydrocarbyl having 1 to 20 carbon atom;

$X_1$ to $X_3$ are each independently selected from the group consisting of hydrogen, halogen, hydrocarbyl having 1 to 20 carbon atoms, and hetero hydrocarbyl having 1 to 20 carbon atoms; or more specifically, selected from the group consisting of hydrogen, halogen, silyl, amino, alkyl amino (having 1 to 20 carbon atoms), alkyl having 1 to 20 carbon atoms, alkenyl having 2 to 20 carbon atoms, cycloalkyl having 3 to 20 carbon atoms, aryl having 6 to 20 carbon atoms, alkylaryl having 7 to 20 carbon atoms and arylalkyl having 7 to 20 carbon atoms; or at least two adjacent to each other of $X_1$ to $X_3$ may be connected to each other to form an aliphatic ring having 5 to 20 carbon atoms or an aromatic ring having 6 to 20 carbon atoms; the aliphatic ring or the aromatic ring may be substituted with halogen, silyl, amino, alkyl amino (having 1 to 20 carbon atoms), alkyl having 1 to 20 carbon atoms, alkenyl having 2 to 20 carbon atoms or aryl having 6 to 20 carbon atoms; and Z is P, As or Sb.

In the transition metal compound of the above Formula 1, a metal site is connected to a cyclopentadienyl ligand connected to a phenylene bridge introducing an amido group, and the structure thereof has a narrow $Cp-M_1-N$ angle and a wide $Q_1-M_1-Q_2$ angle to which a monomer may approach. In addition, different from a CGC structure connected by a silicon bridge, the sites of cyclopentadiene fused with benzothiophene via the bonding of a ring shape, the phenylene bridge, nitrogen and the metal may be connected in order to form a stable and rigid pentagonal ring structure in the compound structure represented by the above Formula 1. In other words, the nitrogen atom of the amino group is connected to the phenylene bridge by two bonds in a ring form, so that a more stable complex structure may be obtained. Thus, when applying these compounds for the polymerization of olefin after reacting with a promotor such as methyl aluminoxane or $B(C_6F_5)_3$ and activating, polyolefin having high activity, high molecular weight and high copolymerization degree may be produced even at a high polymerization temperature. Particularly, since a large amount of alpha-olefin may be introduced as well as polyethylene having low density due to the structural characteristics of the catalyst, a polyolefin copolymer having extremely low density of less than 0.910 g/cc, more specifically 0.855 g/cc to 0.910 g/cc may be produced. In particular, a polymer having narrow MWD, good copolymerization degree and high molecular weight in a low density region may be prepared by using a catalyst composition including the transition metal compound.

In addition, diverse substituents may be introduced in a cyclopentadienyl group fused with benzothiophene and quinolines, and electronic and steric environment around a metal may be easily controlled, and so, the structure and physical properties of the polyolefin thus produced may be controlled. The compound of the above Formula 1 may be preferably used for preparing a catalyst for polymerizing an olefin-based monomer, however the present invention is not limited thereto. The transition metal compound may be used in any other applicable fields.

Meanwhile, the transition metal compound of Formula 2, which is used in combination with the transition metal compound of Formula 1, has a structure in which an imide ligand such as phosphinamide ligands is connected to a derivative of cyclopentadiene having a hetero ring containing sulfur. Accordingly, when the transition metal compound of Formula 2 is applied for the copolymerization of an olefin-based polymer such as ethylene, octene, hexene or butene, an olefin-based polymer having excellent physical properties such as high molecular weight, low density, and the like may be prepared due to high catalytic activity. Further, since it is excellent in compatibility with the transition metal compound of Formula 1 and uniformly mixed in the catalyst composition, the catalytic activity of the catalyst composition may be more improved.

Specifically, in the above Formula 1, $M_1$ may be Ti, Hf or Zr.

In addition, in the above Formula 1, $Q_1$ and $Q_2$ may be each independently selected from the group consisting of hydrogen, halogen, and alkyl having 1 to 6 carbon atoms.

In addition, in the above Formula 1, $R_1$ and $R_2$ may be alkyl having 1 to 20 carbon atoms, more specifically alkyl having 1 to 6 carbon atoms, even more specifically methyl.

In addition, in the above Formula 1, $R_3$ to $R_6$ may be each independently selected from the group consisting of hydrogen, alkyl having 1 to 20 carbon atoms, alkenyl having 2 to 20 carbon atoms, more specifically hydrogen or alkyl having 1 to 20 carbon atoms, even more specifically hydrogen respectively.

In addition, in the above Formula 1, $R_7$ to $R_{10}$ may be each independently hydrogen or alkyl having 1 to 6 carbon atoms.

In addition, in the above Formula 1, $R_{11}$ may be unsubstituted or substituted alkyl having 1 to 20 carbon atoms, aryl having 6 to 20 carbon atoms or alkylaryl having 7 to 20 carbon atoms, wherein the substituted group may be one or at least two selected from the group consisting of halogen, alkyl having 1 to 20 carbon atoms, alkenyl having 2 to 20 carbon atoms, alkoxy having 1 to 20 carbon atoms and aryloxy having 6 to 20 carbon atoms. In addition, in the above Formula 1, $R_{11}$ may be connected to adjacent $R_{10}$ from each other to form an aliphatic ring having 5 to 20 carbon atoms or an aromatic ring having 6 to 20 carbon atoms. Wherein, the aliphatic ring or the aromatic ring may be substituted with one or at least two selected from the group consisting of halogen, alkyl having 1 to 20 carbon atoms, alkenyl having 2 to 20 carbon atoms and aryl having 6 to 20 carbon atoms.

More specifically, when $R_{11}$ is the unsubstituted or substituted alkyl having 1 to 20 carbon atoms, aryl having 6 to 20 carbon atoms or alkylaryl having 7 to 20 carbon atoms, the compound represented by the above Formula 1 may be, for example, one or a mixture of at least two transition metal compounds selected from the group consisting of the compounds represented by the following Formulae:

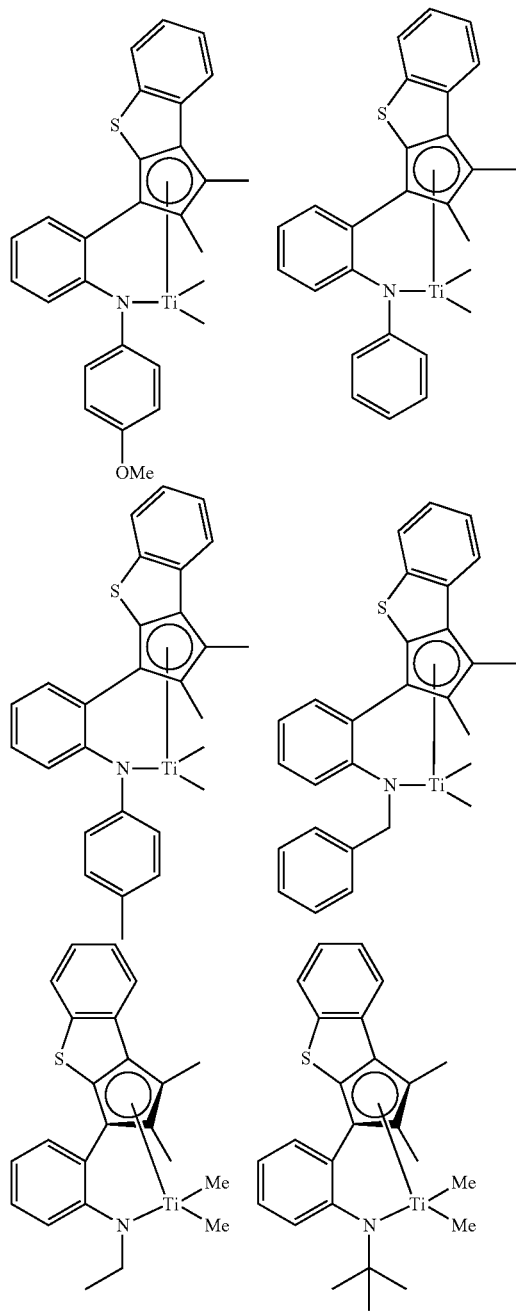

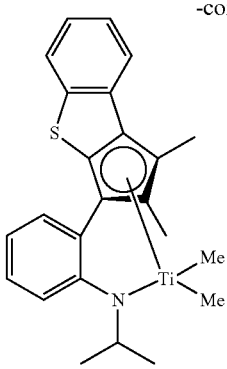

In addition, in the case that $R_{11}$ may be connected to $R_{10}$ adjacent to $R_{11}$ from each other to form an aliphatic ring having 5 to 20 carbon atoms or an aromatic ring having 6 to 20 carbon atoms, the compound represented by the above Formula 1 may be represented by the following Formula 3.

<formula 3>

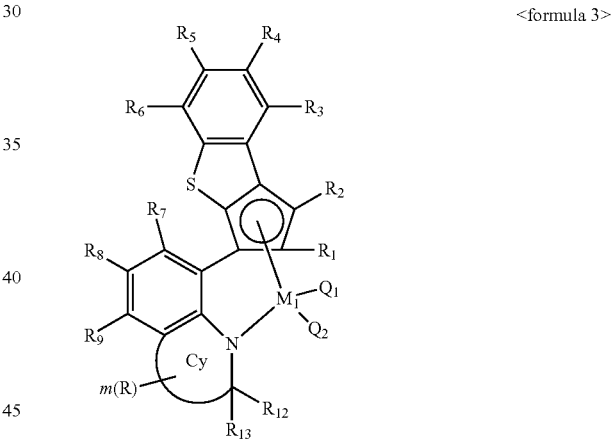

In the above Formula 3, $M_1$, $Q_1$, $Q_2$, and $R_1$ to $R_9$ are the same as defined in the above Formula 1;

Cy may be a four-membered or five-membered aliphatic ring;

R, $R_{12}$ and $R_{13}$ may be each independently selected from the group consisting of hydrogen, alkyl having 1 to 20 carbon atoms, alkenyl having 2 to 20 carbon atoms, aryl having 6 to 20 carbon atoms, alkylaryl having 7 to 20 carbon atoms, and arylalkyl having 7 to 20 carbon atoms;

in the case when Cy is the four-membered aliphatic ring, m is an integer from 0 to 2, and in the case when Cy is the five-membered aliphatic ring, m is an integer from 0 to 4.

More specifically, the above Formula 3 may be represented by the following Formula 3a or 3b.

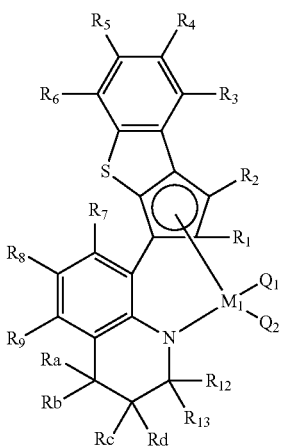

<Formula 3a>

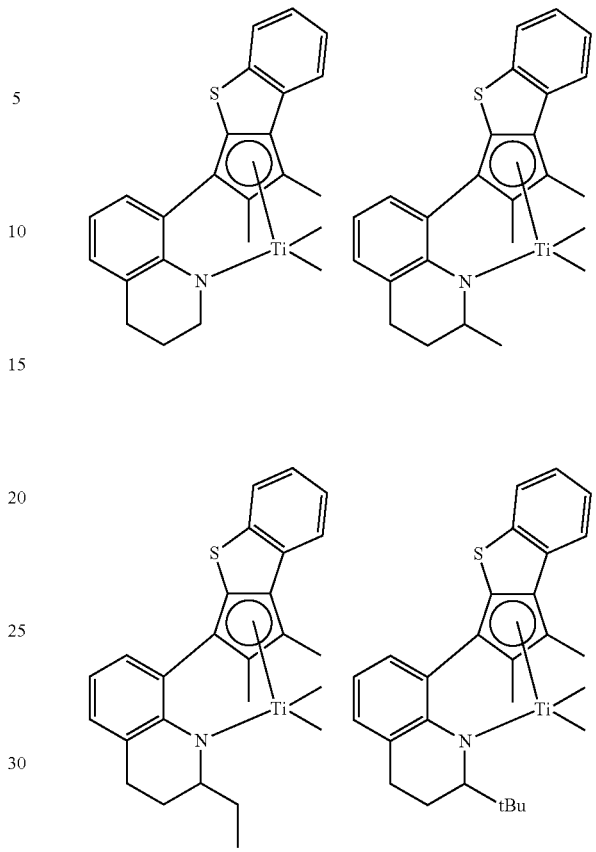

In the above Formula 3a, $R_a$ to $R_d$ may be each independently selected from the group consisting of hydrogen, alkyl having 1 to 20 carbon atoms, alkenyl having 2 to 20 carbon atoms, aryl having 6 to 20 carbon atoms, alkylaryl having 7 to 20 carbon atoms, and arylalkyl having 7 to 20 carbon atoms; and the remaining substituents are the same as defined in Formula 1.

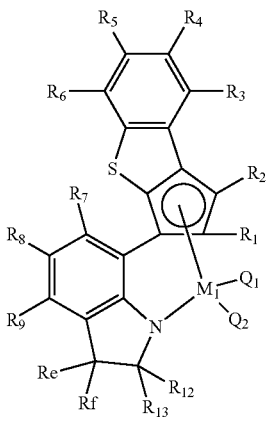

<Formula 3b>

In the above Formula 3b, $R_e$ to $R_f$ may be each independently selected from the group consisting of hydrogen, alkyl having 1 to 20 carbon atoms, alkenyl having 2 to 20 carbon atoms, aryl having 6 to 20 carbon atoms, alkylaryl having 7 to 20 carbon atoms, and arylalkyl having 7 to 20 carbon atoms; and the remaining substituents are the same as defined in Formula 1.

Specific examples of the transition metal compound represented by the above formula 3 may be a compound represented by the following formulae:

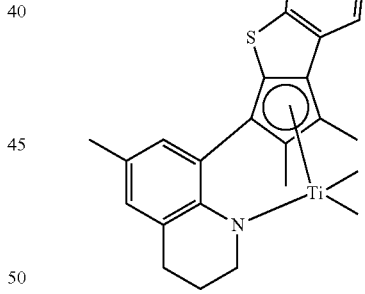

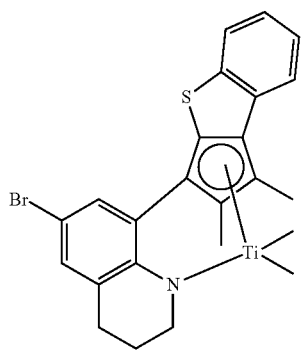

-continued

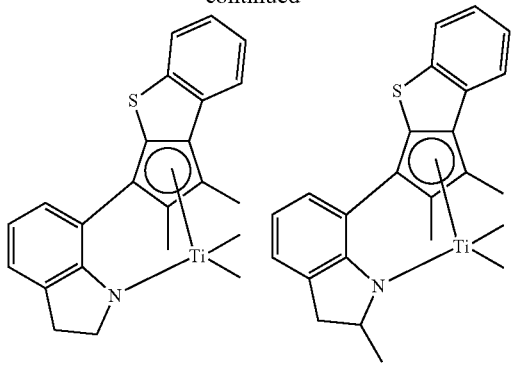

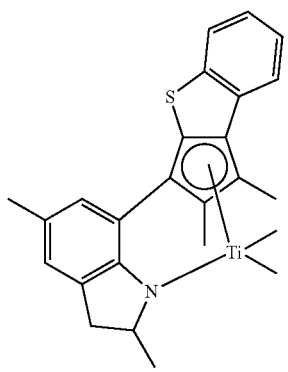

The compound of the above Formula 1 may be prepared by the following steps:

a) preparing a compound represented by the following <Formula 5> by reacting an amine compound represented by the following <Formula 4> with an alkyllithium, and adding a compound including a protecting group (—$R_0$);

b) preparing an amine compound represented by the following <Formula 7> by reacting a compound represented by the above <Formula 5> with an alkyllithium, and adding a ketone compound represented by the following <Formula 6>;

c) preparing a dilithium compound represented by the following <Formula 8> by reacting a compound represented by the above <Formula 7> with n-butyllithium; and d) preparing a transition metal compound represented by Formula 1 by reacting a compound represented by the above <Formula 8>, $MCl_4$ (M=a transition metal in group 4), and an organolithium.

<Formula 4>

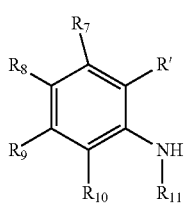

<Formula 5>

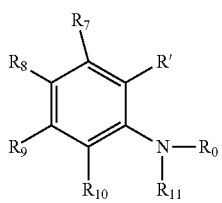

<Formula 6>

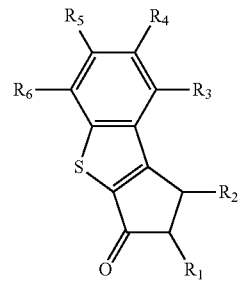

<Formula 7>

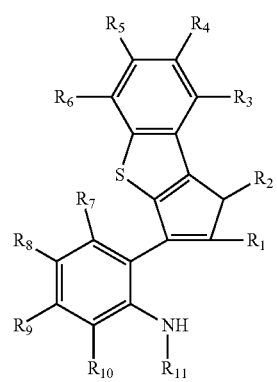

<Formula 8>

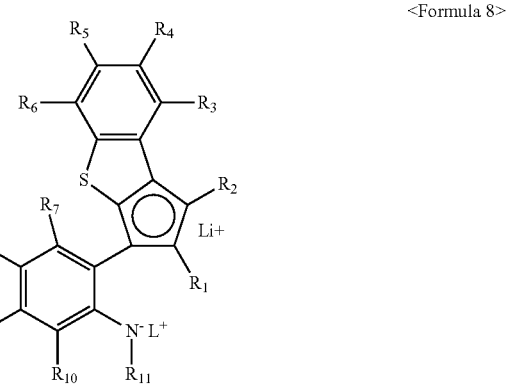

In the above Formulae 4 to 8,
R' may be hydrogen,
$R_0$ may be a protecting group, and
other substituents are the same as defined in Formula 1.

In the above step a), a compound including the protecting group may be selected from trimethylsilyl chloride, benzyl chloride, t-butoxycarbonyl chloride, benzyloxycarbonyl chloride and carbon dioxide.

When the compound including the protecting group is the carbon dioxide, the above Formula 5 may be a lithium carbamate compound represented by the following Formula 5a:

<Formula 5a>

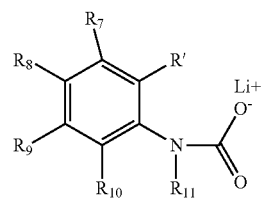

In the above Formula 5a, the substituents are the same as defined in Formula 1.

According to a particular embodiment, the compound of Formula 1 may be prepared by the following Reaction 1.

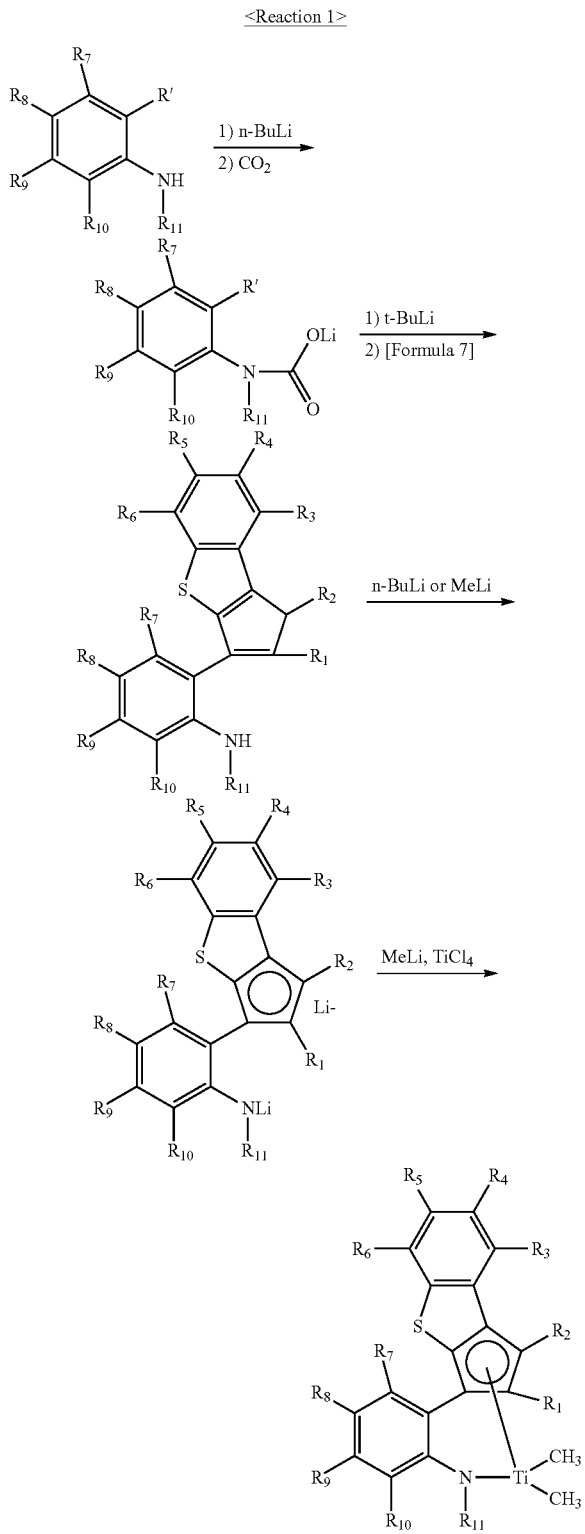

In the above Reaction 1, substituents are the same as defined in Formula 1.

Meanwhile, the transition metal compound represented by the above formula 2 may be represented by the following Formula 2a.

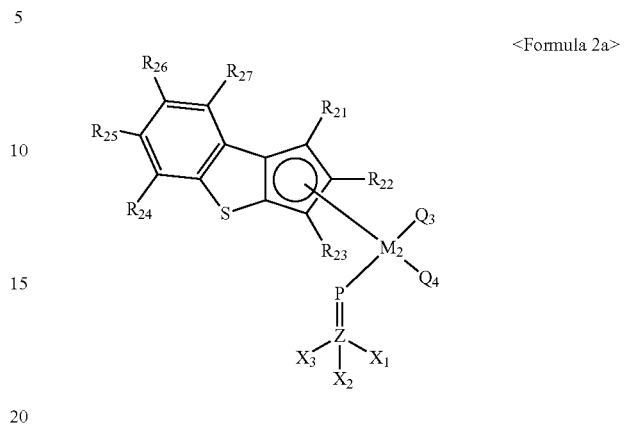

<Formula 2a>

In the above Formula 2a, $M_2$ may be the same as defined in the above, specifically Ti, Hf or Zr;

$Q_3$ and $Q_4$ may be the same as defined in the above, specifically each independently Halogen or alkyl having 1 to 8 carbon atoms;

$R_{21}$ to $R_{27}$ may be the same as defined in the above, more specifically each independently selected from the group consisting of hydrogen, halogen, silyl, alkyl having 1 to 8 carbon atoms, alkenyl having 2 to 6 carbon atoms, cycloalkyl having 3 to 12 carbon atoms, aryl having 6 to 18 carbon atoms, alkylaryl having 7 to 18 carbon atoms, arylalkyl having 7 to 18 carbon atoms, and a metalloid radical of a metal in group 14 substituted with hydrocarbyl having 1 to 8 carbon atom; even more specifically $R_{21}$ to $R_{27}$ may be each independently hydrogen, alkyl having 1 to 8 carbon atoms or alkyl having 1 to 4 carbon atoms;

$X_1$ to $X_3$ may be the same as defined in the above; more specifically $X_1$ to $X_3$ may be each independently selected from the group consisting of hydrogen, halogen, silyl, amino, alkyl amino (having 1 to 8 carbon atoms), alkyl having 1 to 8 carbon atoms, alkenyl having 2 to 6 carbon atoms, cycloalkyl having 3 to 12 carbon atoms, aryl having 6 to 18 carbon atoms, alkylaryl having 7 to 18 carbon atoms, and arylalkyl having 7 to 18 carbon atoms; or at least two adjacent to each other of $X_1$ to $X_3$ may be connected to each other to form an cycloalkyl having 5 to 12 carbon atoms or an aryl having 6 to 20 carbon atoms; the aliphatic ring or the aromatic ring may be substituted with halogen, silyl, amino, alkyl amino (having 1 to 8 carbon atoms), alkyl having 1 to 8 carbon atoms, alkenyl having 2 to 6 carbon atoms or aryl having 6 to 12 carbon atoms; even more specifically $X_1$ to $X_3$ may be each independently selected from the group consisting of halogen, alkyl having 1 to 8 carbon atoms, cycloalkyl having 3 to 12 carbon atoms, and aryl having 6 to 12 carbon atoms.

More specifically, the second transition metal compound of Formula 2, which is more preferred for controlling the electronic stereoscopic environment around the metal, may be the following compounds, and any one or a mixture of two or more thereof may be used.

(2-1)

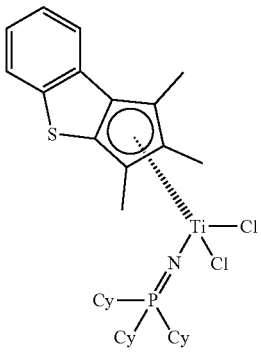

(2-2)

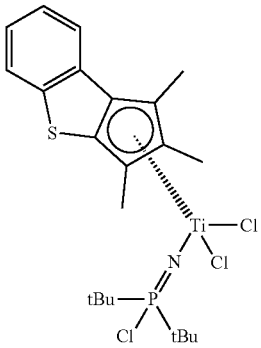

(2-3)

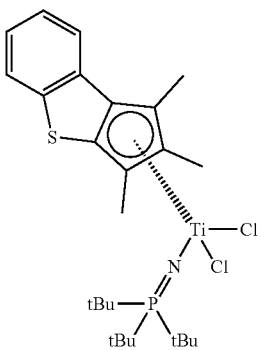

(2-4)

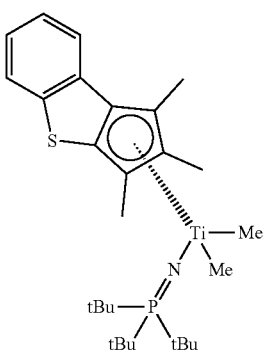

-continued (2-5)

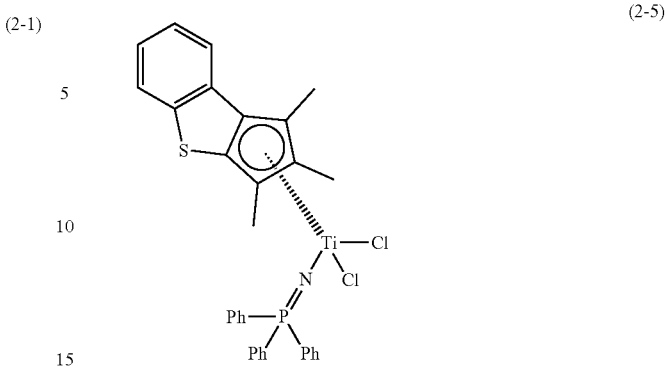

In the above chemical formulae, Cy means cyclohexyl, tBu means t-butyl, Me means methyl and Ph means phenyl.

In addition to the above exemplified compounds, the transition metal compound of Formula 2 may have various structures within the scope defined in Formula 2, and these compounds may exhibit equivalent actions and effects.

The transition metal compound of the above formula 2 may be prepared using a known synthesis reaction.

The catalyst composition used for preparing the olefin-based polymer may comprise the transition metal compounds represented by the formulae 1 and 2 in a weight ratio of 99:1 to 1:99. When the mixing ratios of the transition metal compounds of the above formulae 1 and 2 are out of the above range, it is difficult to prepare the olefin-based polymer satisfying the above-mentioned physical property requirements. More specifically, the catalyst composition may be prepared by mixing the transition metal compounds of the above formulae 1 and 2 in a weight ratio of 50:50 to 80:20.

The catalytic composition may further include a cocatalyst.

As the cocatalyst, those known in the art such as alkylaluminoxane, alkylaluminum or Lewis acid may be used without particular limitation. Specifically, the cocatalyst may comprise any one or a mixture of two or more selected from the group consisting of compounds represented by the following formulae 9 to 12:

$$—[Al(R_{41})—O]_a—$$ <Formula 9>

In the Formula 9, $R_{41}$ may be independently halogen, hydrocarbyl having 1 to 20 carbon atoms, or hydrocarbyl having 1 to 20 carbon atoms substituted with halogen, and a is an integer greater than or equal to 2;

$$D(R_{42})_3$$ <Formula 10>

In the Formula 10, D may be aluminum or boron, and $R_{42}$ may be independently halogen, hydrocarbyl having 1 to 20 carbon atoms, or hydrocarbyl having 1 to 20 carbon atoms substituted with halogen;

$$[L-H]+[Z(A)_4]-$$ <Formula 11>

$$[L]+[Z(A)_4]-$$ <Formula 12>

In the Formulae 11 and 12, L may be a neutral or cationic Lewis acid, H may be a hydrogen atom, Z may be an element in group 13, and A may be independently aryl having 6 to 20 carbon atoms or alkyl having 1 to 20 carbon atoms, where hydrogen atom may be substituted with a substituent, and the substituent may be halogen, hydrocarbyl having 1 to 20 carbon atoms, alkoxy having 1 to 20 carbon atoms, or aryloxy having 6 to 20 carbon atoms.

According to an embodiment, first, a method including a step of obtaining a mixture by contacting the catalyst composition with a compound represented by the above Formula 9 or Formula 10; and a step of adding a compound represented by the above Formula 11 or Formula 12 into the mixture may be provided as the method of preparing the catalyst composition.

Second, a method of preparing a catalyst composition by contacting the catalyst composition with the compound represented by the above Formula 11 or Formula 12 may be provided.

According to another embodiment, in the first method among the preparing methods of the catalyst composition according to the above embodiment, the molar ratio of the compound represented by the Formula 9 or Formula 10 with respect to the catalyst composition may be each independently from 1:2 to 1:5,000, more specifically from 1:10 to 1:1,000, and even more specifically from 1:20 to 1:500.

Meanwhile, a molar ratio of the compound represented by the Formula 11 or Formula 12 with respect to the catalyst composition may be 1:1 to 1:25, more specifically 1:1 to 1:10, and even more specifically 1:1 to 1:5.

In the case that the molar ratio of the compound represented by the Formula 9 or Formula 10 with respect to the catalyst composition is less than 1:2, the amount of an alkylating agent is very small, and the alkylation of a metal compound may not be completely carried out, and when the molar ratio exceeds 1:5,000, the activation of the alkylated metal compound may not be completely carried out due to the side reaction of the remaining excessive alkylating agent with the activation agent of the Formula 14 even though the alkylation of the metal compound may be carried out.

In addition, in the case that the molar ratio of the compound represented by the Formula 11 or Formula 12 with respect to the total amount of the transition metal compound of the Formula 1 and Formula 2 is less than 1:1, the amount of the activation agent is relatively small, and the activation of the metal compound may not be completely carried out, thereby deteriorating the activity of the catalyst composition prepared. In the case that the molar ratio exceeds 1:25, the remaining excessive amount of the activation agent may decrease the economic performance in consideration of the unit price of the catalyst composition, or the purity of a polymer thus produced may be decreased even though the activation of the metal compound may be completely carried out.

In the second method of the preparation methods of a catalytic composition, the molar ratio of the compound represented by the above Formula 10 with respect to the catalyst composition may be from 1:1 to 1:500, more specifically from 1:1 to 1:50, and even more specifically from 1:2 to 1:25. In the case that the molar ratio is less than 1:1, the amount of the activation agent is relatively small, and the activation of the metal compound may not be completely carried out, thereby deteriorating the activity of the catalyst composition prepared. In the case that the molar ratio exceeds 1:500, the remaining excessive amount of the activation agent may decrease the economic performance in consideration of the unit price of the catalyst composition, or the purity of a polymer thus produced may be decreased even though the activation of the metal compound may be completely carried out.

As a reaction solvent comprising an aliphatic hydrocarbon solvent having 5 to 12 carbon atoms such as pentane, hexane, heptane, etc., a hydrocarbon solvent substituted with a chlorine atom such as dichloromethane and chlorobenzene, or an aromatic hydrocarbon solvent such as benzene, toluene, etc. may be used during the preparation of the catalyst composition. However, the solvent is not limited thereto, and all solvents useful in this field may be used. The solvent used is preferably treated with a small amount of alkylaluminum to remove a trace amount of water or air functioning as a catalytic poison, and a promotor may be further included.

In addition, the composition may further include an additive. For example, the composition may include a compound containing a hetero atom. Particularly, the compound containing a hetero atom may include a heterocyclic compound; or an alkane containing a hetero atom.

Examples of the heterocyclic compound may include an aromatic ring containing a hetero atom; a heterocycloalkane; or a heterocycloalkene. Examples of the alkane containing a hetero atom may include an alkane including an amine group or an ether group. The aromatic ring containing a hetero atom; the heterocycloalkane; or the heterocycloalkene may include a five membered or six membered ring. The compound containing a hetero atom may include O, S, Se, N, P or Si as the hetero atom. The compound containing a hetero atom may include one hetero atom. The compound containing a hetero atom may be substituted, and in the case that the compound containing a hetero atom is substituted, the compound may be substituted with at least one selected from the group consisting of hydrogen, methyl, phenyl and benzyl.

Examples of the compound containing a hetero atom may include at least one selected from the group consisting of pyridine, 3,5-dimethylpyridine, 2,4,6-trimethylpyridine, 2,6-dimethylpyridine, 2,4-dimethylpyridine, thiophene, 2-methylthiophene, 2,3-dimethylthiophene, piperidine, phosphinine, pyrrole, 2-methylpyrrole, aniline, p-toluidine, tetrahydrofuran, 2,3-dimethyltetrahydrofuran, 2,5-tetrahydrofuran, 3,4-dihydro-2H-pyrene, furan, 2-methylfuran, 2,3-dimethylfuran, 2,5-dimethylfuran, diethyl ether, methyl t-butyl ether and triethylamine, without limitation.

In addition, the transition metal compound of Chemical Formula 1 and Formula 2 and 1 and the cocatalyst may be used as a supported state on a support. As the support, silica-alumina, silica-magnesia, etc. may be used, and other optional support known in this art may be used. In addition, this support may be used as a dried state at a high temperature. The drying temperature may be, for example, from 180° C. to 800° C. In the case that the drying temperature is excessively low and less than 180° C., an excessive amount on the support may react with the promoter and deteriorate the performance. In the case that the drying temperature is excessively high and exceeds 800° C., the amount of a hydroxyl group on the surface of the support may decrease and decrease reaction site with the promotor.

In addition, the compound represented by Chemical Formula 9 may be any alkylaluminoxane. Specifically, methylaluminoxane, ethylaluminoxane, isobutylaluminoxane, butylaluminoxane, etc. may be used, and methylaluminoxane may be particularly specifically used.

In addition, the compound represented by the above Formula 10 may be trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. More specifically, the compound may be selected from trimethylaluminum, triethylaluminum and triisobutylaluminum.

In addition, the compound represented by the Formula 11 or Formula 12 may be triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, triethylammoniumtetraphenylaluminum, tributylammoniumtetraphenylaluminum, trimethylammoniumtetraphenylboron, tripropylammoniumtetraphenylboron, trimethylammoniumtetra(p-tolyl)boron, tripropylammoniumtetra(p-tolyl)boron, triethylammoniumtetra(o,p-dimethylphenyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, triphenylcarboniumtetra(p-trifluoromethylphenyl)boron, triphenylcarboniumtetrapentafluorophenylboron, etc.

Meanwhile, a monomer usable for the preparation of the olefin-based may be an alpha-olefin-based monomer, a cyclic olefin-based monomer, a diene olefin-based monomer, a triene olefin-based monomer, or a styrene-based monomer, etc., and the olefin-based may be obtained by homopolymerizing one kind thereof or by blending at least two thereof.

The alpha-olefin-based monomer includes an aliphatic olefin having 2 to 12 carbon atoms, and preferably 2 to 8 carbon atoms, and particularly includes ethylene, propylene, 1-butene, 1-pentene, 3-methyl-1-butene, 1-hexene, 4-methyl-1-pentene, 3-methyl-1-pentene, 1-heptene, 1-octene, 1-decene, 4,4-dimethyl-1-pentene, 4,4-diethyl-1-hexene, 3,4-dimethyl-1-hexene, etc. In addition, the alpha-olefin may be homopolymerized or alternating, random or block copolymerized.

The copolymerization of the alpha-olefin include the copolymerization of ethylene with the alpha-olefin having 2 to 12 carbon atoms, preferably having 2 to 8 carbon atoms (ethylene with propylene, ethylene with 1-butene, ethylene with 1-hexene, ethylene with 4-methyl-1-pentene and ethylene with 1-octene) and the copolymerization of propylene with the alpha-olefin having 2 to 12 carbon atoms, preferably having 2 to 8 carbon atoms (propylene with 1-butene, propylene with 4-methyl-1-pentene, propylene with 4-methyl-1-butene, propylene with 1-hexene and propylene with 1-octene).

In the copolymerization of the ethylene or propylene with other alpha-olefin, the amount of the other alpha-olefin may be selected from less than or equal to 90 wt % based on the total amount of the monomer. In general, the amount of the other alpha-olefin may be less than or equal to 70 wt %, preferably less than or equal to 60 wt %, and more preferably less than or equal to 50 wt % for an ethylene copolymer, and may be from 1 to 90 wt %, preferably from 5 to 90 wt %, and more preferably from 10 to 70 wt % for a propylene copolymer.

The cyclic olefin may include 3 to 24 carbon atoms, and may preferably include 3 to 18 carbon atoms. Particularly, cyclopentene, cyclobutene, cyclehexene, 3-methylcyclohexene, cyclooctene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene and ethylenenorbornene may be used. The cyclic olefin may be copolymerized with the alpha-olefin, and in this case, the amount of the cyclic olefin may be from 1 to 50 wt % and may specifically be 2 to 50 wt % with respect to a copolymer.

In addition, the diene and triene may be a polyene having two or three double bonds and 4 to 26 carbon atoms. Particularly, 1,3-butadiene, 1,4-pentadiene, 1,4-hexadiene, 1,5-hexadiene, 1,9-decadiene, 2-methyl-1,3-butadidne, etc. may be used. The styrene may preferably be styrene or styrene substituted with an alkyl group having 1 to 10 carbon atoms, an alkoxy group having 1 to 10 carbon atoms, a halogen group, an amine group, a silyl group, a halogenated alkyl group, etc.

The polymerization step may be performed in a hydrocarbon solvent via solution phase, slurry phase, bulk phase or gas phase polymerization.

The catalyst composition may have a homogeneous solution state, a supported state on a support or an insoluble particle state of a support, and so, the polymerization may be performed via the solution phase, the slurry phase, the bulk phase or the gas phase polymerization. In addition, polymerization conditions of each polymerization method may be diversely modified according to the state of a catalyst (homogeneous phase or inhomogeneous phase (supported type)), a polymerization method (solution polymerization, slurry polymerization, gas polymerization), target polymerization result or a polymer type. The modification degree may be easily determined by an expert in this field.

The hydrocarbon solvent dissolved or diluted in an aliphatic hydrocarbon solvent having 5 to 12 carbon atoms such as pentane, hexane, heptane, nonane, decane and an isomer thereof, an aromatic hydrocarbon solvent such as toluene and benzene, or a hydrocarbon solvent substituted with a chlorine atom such as dichloromethane and chlorobenzene, may be used alone or as a mixture of at least two thereof and injected. At least one of the solvent dissolved or diluted may be mixed and injected. The solvent used may preferably be treated with a small amount of alkylaluminum to remove a trace amount of water or air functioning as a catalytic poison, and a promotor may be further included.

The alkylaluminum may comprise, for example, trialkylaluminum, dialkyl aluminum halide, alkyl aluminum dihalide, aluminum dialkyl hydride or alkyl aluminum sesquihalide, etc. More particularly, $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$ or $(C_2H_5)_3Al_2Cl_3$ etc. may be used. These organic aluminum compounds may be continuously inserted in each reactor and may be inserted by the molar ratio from about 0.1 to 10 mol per 1 kg of a reaction medium inserted in the reactor to remove water appropriately.

In addition, the polymerization step may be performed in a batch type reactor or a continuous type reactor, and may preferably be performed in a continuous type reactor.

In addition, the polymerization step may be performed in the presence of an inert gas such as an argon gas or a nitrogen gas.

The inert gas may be, for example, a nitrogen gas or a hydrogen gas alone or a mixture thereof.

By using the inert gas, the suppression of the catalyst activity due to the injection of water or impurities in the air may be prevented. The amount ratio of the inert gas:the olefin-based monomer inserted may be from about 1:10 to about 1:100, without limitation. In the case that the amount of the inert gas is excessively small, the reaction of the catalyst composition may be violent, and the preparation of the olefin-based polymer having molecular weight and molecular weight distribution may become difficult. In the case that an excessive amount of the inert gas is inserted, the activity of the catalyst composition may be insufficiently attained.

The polymerization temperature during copolymerizing the ethylene and the alpha-olefin as a comonomer using the catalyst may be from about 130° C. to about 250° C., and may preferably be from about 140° C. to about 200° C.

In addition, the polymerization pressure may be from about 1 bar to about 150 bar, specifically from about 1 bar to about 120 bar, and even more specifically from about 10 bar to about 120 bar.

The olefin-based polymer prepared by the above-described preparing method may be surface-treated with an inorganic substance such as talc, Ca-based or Si-based in accordance with a conventional method. Accordingly, the olefin-based polymer according to the present invention may further comprise a coating layer containing an inorganic substance such as talc, Ca-based or Si-based on the surface thereof.

According to another embodiment of the present invention, there is provided a catalyst composition useful in the production of the olefin-based polymer, comprising the transition metal compound of Formula 1 and the transition metal compound of Formula 2.

The catalyst composition is the same as that described in the preparing method of the olefin-based polymer.

Hereinafter, the present invention will be explained in more detail referring to examples and experimental examples, however the present invention is not limited to the following examples and experimental examples.

Synthesis of Ligand and Transition Metal Compound

Organic reagents and solvents were purchased from Aldrich Co. and purified by a standard method unless otherwise specifically stated. In all synthetic steps, the contact of the air and moisture were blocked to improve the reproducibility of experiments.

Preparation Example 1

Preparation of a compound of 8-(1,2-dimethyl-1H-benzo[b]cyclopenta[d]thiophen-3-yl)-2-methyl-1,2,3,4-tetrahydroquinoline n-BuLi (14.9 mmol, 1.1 eq) was slowly added drop by drop in a solution of 2-methyl-1,2,3,4-tetrahydroquinoline (2 g, 13.6 mmol) dissolved in 10 mL of ether at −40° C. The temperature was slowly elevated to room temperature, and the reaction mixture was stirred at room temperature for 4 hours. The temperature was lowered to −40° C. again and $CO_2(g)$ was inserted, and the reaction was maintained for 0.5 hours at a low temperature. The temperature was slowly elevated, and remaining $CO_2(g)$ was removed via a bubbler. THF (17.6 mmol, 1.4 mL) and t-BuLi(10.4 mmol, 1.3 eq) were inserted in the reaction mixture at −20° C., following by aging at a low temperature at −20° C. for 2 hours. The ketone (1.9 g, 8.8 mmol) was dissolved in diethyl ether and slowly added drop by drop in the reaction mixture. After stirring at room temperature for 12 hours, 10 mL of water was inserted and hydrochloric acid (2N, 60 mL) was added in the reactant, followed by stirring for 2 minutes. Organic solvents were extracted and the reactant was neutralized with a $NaHCO_3$ aqueous solution. Then, the organic solvent was extracted and dried with $MgSO_4$. Through silica gel column chromatography, an yellow oil (1.83 g, 60% yield) was obtained.

1H NMR ($C_6D_6$): δ 1.30 (s, 3H, $CH_3$), 1.35 (s, 3H, $CH_3$), 1.89~1.63 (m, 3H, Cp-H quinoline-$CH_2$), 2.62~2.60 (m, 2H, quinoline-$CH_2$), 2.61~2.59 (m, 2H, quinoline-$NCH_2$), 2.70~2.57 (d, 2H, quinoline-$NCH_2$), 3.15~3.07 (d, 2H, quinoline-$NCH_2$), 3.92 (broad, 1H, N—H), 6.79~6.76 (t, 1H, aromatic), 7.00~6.99 (m, 2H, aromatic), 7.30~7.23 (m, 2H, aromatic), 7.54~7.53 (m, 1H, aromatic), 7.62~7.60 (m, 1H, aromatic) ppm Preparation of a compound of 8-(1,2-dimethyl-1H-benzo[b]cyclopenta[d]thiophen-3-yl)-2-methyl-1,2,3,4-tetrahydroquinoline-titanium dichloride n-BuLi (3.0 mmol, 2.1 eq) was slowly added drop by drop in the ligand, i.e., 8-(1,2-dimethyl-1H-benzo[b]cyclopenta[d]thiophen-3-yl)-2-methyl-1,2,3,4-tetrahydroquinoline (1.0 g, 2.89 mmol) at −20° C. The formation of yellow slurry was observed, and the temperature was slowly elevated to room temperature, followed by stirring at room temperature for 12 hours. $TiCl_4DME$ (806 mg, 2.89 mmol, 1.0 eq) was added drop by drop, followed by stirring at room temperature for 12 hours. After removing solvents, the reactant was extracted with toluene to obtain a red solid (700 mg, 52% yield).

1H NMR ($C_6D_6$): δ 1.46~1.467 (t, 2H, quinoline-$NCH_2$), 1.85 (s, 3H, Cp-$CH_3$), 1.79 (s, 3H, Cp-$CH_3$), 2.39 (s, 3H, Cp-$CH_3$), 2.37 (s, 3H, Cp-$CH_3$), 2.10~2.07 (t, 2H, quinoline-$NCH_2$), 5.22~5.20 (m, 1H, N—CH), 5.26~5.24 (m, 1H, N—CH), 6.89~6.87 (m, 2H, aromatic) 6.99~6.95 (m, 1H, aromatic), 7.19~7.08 (m, 2H, aromatic), 7.73~7.68 (m, 1H, aromatic) ppm Preparation Example 2

MeMgBr (1.62 mL, 4.86 mmol, 2.05 eq) was slowly added drop by drop in a solution of a compound represented by the following Formula (i) (1.30 g, 2.37 mmol) dissolved in 20 mL of toluene at room temperature (23° C.). The reaction mixture was stirred at room temperature for 12 hours. The toluene solvent was filtered under reduced pressure, and the reaction mixture was dissolved in hexane (30 mL), after the disappearance of starting material was checked with NMR. A solid was removed by filtration, and the hexane solvent was filtered under reduced pressure to obtain a transition metal compound represented by the following formula (ii).

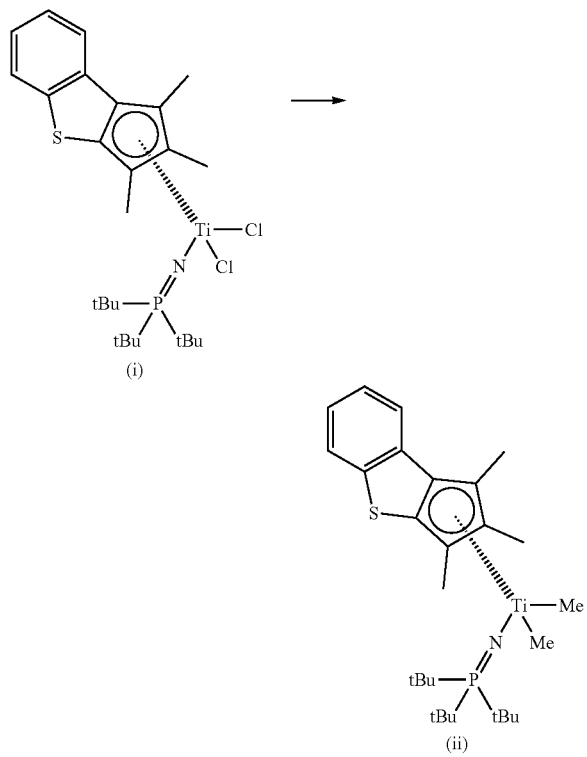

1H NMR (500 MHz, $C_6D_6$): δ 7.62 (d, 1H), 7.48 (d, 1H), 7.13 (t, 1H), 7.03 (t, 1H), 2.30 (s, 3H), 2.09 (s, 3H), 2.02 (s, 3H), 1.28 (d, 27H), −0.24 (s, 3H), −0.27 (s, 3H)

<Preparation of Olefin Polymer>

Example 1

In a 1.5 L autoclave continuous process reactor, a hexane solvent (4.67 kg/h) and 1-octene (1.42 kg/h) were added, and the temperature of the upper end portion of the reactor was pre-heated to 160° C. A triisobutylaluminum compound (0.03 mmol/min), a mixture of the transition metal compound prepared in Preparation Example 1 and the transition metal compound prepared in Preparation Example 2 (mixing ratio by weight=75:25, 0.675 μmol/min), and dimethylanilinium tetrakis(pentafluorophenyl)borate promotor (2.03 μmol/min) were added in the reactor at the same time. Then, ethylene (0.87 kg/h) was inserted in the autoclave reactor, and the reaction mixture was maintained under the pressure of 89 bar at 160° C. for 30 minutes, and a copolymerization reaction was performed in a continuous process to produce an ethylene-1-octene copolymer. After that, a remaining ethylene gas was exhausted, and a polymer solution was dried in a vacuum oven and dried for at least 12 hours. Then, physical properties thereof were measured.

Example 2

An olefin-based polymer was prepared by the same procedure described in the above Example 1 except for using 1-octene (1.55 kg/h), triisobutylaluminum compound (0.03 mmol/min), a mixture of the transition metal compound prepared in Preparation Example 1 and the transition metal compound prepared in Preparation Example 2 (mixing ratio by weight=75:25, 0.75 μmol/min), and dimethylanilinium tetrakis(pentafluorophenyl)borate promotor (2.25 μmol/min).

Example 3

An olefin-based polymer was prepared by the same procedure described in the above Example 1 except for using 1-octene (1.51 kg/h), triisobutylaluminum compound (0.05 mmol/min), a mixture of the transition metal compound prepared in Preparation Example 1 and the transition metal compound prepared in Preparation Example 2 (mixing ratio by weight=75:25, 0.75 μmol/min), and dimethylanilinium tetrakis(pentafluorophenyl)borate promotor (2.25 μmol/min).

Example 4

An olefin-based polymer was prepared by the same procedure described in the above Example 1 except for using 1-octene (1.30 kg/h), triisobutylaluminum compound (0.04 mmol/min), a mixture of the transition metal compound prepared in Preparation Example 1 and the transition metal compound prepared in Preparation Example 2 (mixing ratio by weight=75:25, 0.58 μmol/min), and dimethylanilinium tetrakis(pentafluorophenyl)borate promotor (1.40 μmol/min).

Example 5

An olefin-based polymer was prepared by the same procedure described in the above Example 1 except for using 1-octene (1.30 kg/h), triisobutylaluminum compound (0.04 mmol/min), a mixture of the transition metal compound prepared in Preparation Example 1 and the transition metal compound prepared in Preparation Example 2 (mixing ratio by weight=75:25, 0.70 μmol/min), and dimethylanilinium tetrakis(pentafluorophenyl)borate promotor (2.0 μmol/min).

Comparative Example 1

An ethylene-1-octene copolymer having a talc coating layer of Dow Co. (trade name; Eg8407) prepared by using only one kind of a metallocene catalyst was prepared.

Comparative Example 2

An ethylene-1-octene copolymer of Dow Co. (trade name; Eg8200) prepared by using only one kind of a metallocene catalyst was prepared.

Comparative Example 3

An ethylene-1-octene copolymer of LG Chem. Ltd. (trade name; LC170) prepared by using only one kind of a metallocene catalyst was prepared.

Comparative Example 4

In a 1.5 L autoclave continuous process reactor, a hexane solvent (4.67 kg/h) and 1-octene (1.42 kg/h) were added, and the temperature of the upper end portion of the reactor was pre-heated to 160° C. A triisobutylaluminum compound (0.03 mmol/min), a mixture of [(1,2,3,4-tetrahydroquinolin- 8-yl)tetramethylcyclopentadienyl-η5,κ-N]titanium dimethyl and tert-butyl(((1,2-dimethyl-3H-benzo[b]cyclopenta[d]thiophen-3-yl)dimethylsilyl)amino)dimethyl titanium (mixing ratio by weight ratio=75:25, 0.675 μmol/min), and dimethylanilinium tetrakis(pentafluorophenyl)borate promotor (2.03 μmol/min) were added in the reactor at the same time. Then, ethylene (0.87 kg/h) was inserted in the autoclave reactor, and the reaction mixture was maintained under the pressure of 89 bar at 160° C. for 30 minutes, and a copolymerization reaction was performed in a continuous process to produce an ethylene-1-octene copolymer. After that, a remaining ethylene gas was exhausted, and a polymer solution was dried in a vacuum oven and dried for at least 12 hours. Then, physical properties thereof were measured.

Comparative Example 5

An olefin-based polymer was prepared by the same procedure described in the above Comparative Example 4 except for using 1-octene (1.39 kg/h), triisobutylaluminum compound (0.04 mmol/min), a mixture of [(1,2,3,4-tetrahydroquinolin-8-yl)tetramethylcyclopentadienyl-η5,κ-N]titanium dimethyl and dimethyl(1,2,3,4,5-pentamethylcyclopenta-2,4-dien-1-yl) ((tri-tert-butyl-15-phosphanylidene)amino)titanium (mixing ratio by weight ratio=75:25, 0.70 μmol/min), and dimethylanilinium tetrakis(pentafluorophenyl)borate promotor (2.0 μmol/min).

Experimental Example 1: Evaluation of Physical Properties of the Olefin-Based Polymer Various properties were measured and evaluated for the olefin-based polymers prepared in Examples 1 to 5 and Comparative Examples 1 to 5 by the following methods.

(1) Density of a polymer (g/cc): measured by ASTM D-792

(2) Melt Index(MI, g/10 min) of a polymer: measured by ASTM D-1238 (Condition E, 190° C., 2.16 kg weight)

(3) Weight average molecular weight (Mw, g/mol) and Molecular weight distribution (MWD): obtained by measuring number average molecular weight (Mn) and weight average molecular weight (Mw) using gel permeation chromatography (GPC), and dividing the weight average molecular weight by the number average molecular weight (4) TREF (temperature rising elution fractionation)

TREF was measured by using a TREF machine of PolymerChar and an o-dichlorobenzene solvent in a range of from −20 to 120° C.

Specifically, 40 mg of a polymer sample was dissolved in 20 ml of an o-dichlorobenzene solvent at 135° C. for 30 minutes and stabilized at 95° C. for 30 minutes. The solution thus obtained was introduced in a TREF column, cooled to −20° C. by the temperature decreasing rate of 0.5° C./min, and supported for 2 minutes. Then, the temperature was increased from −20° C. to 120° C. by the temperature increasing rate of 1° C./min, and the concentration of an eluted polymer was measured while flowing the o-dichlorobenzene solvent in the column by the flowing rate of 0.5 mL/min.

(5) GPC peak number: Observed by gel permeation chromatography (GPC) analysis

The measured results are illustrated in the following Table 1 and FIGS. 1 to 5.

Figure 5:
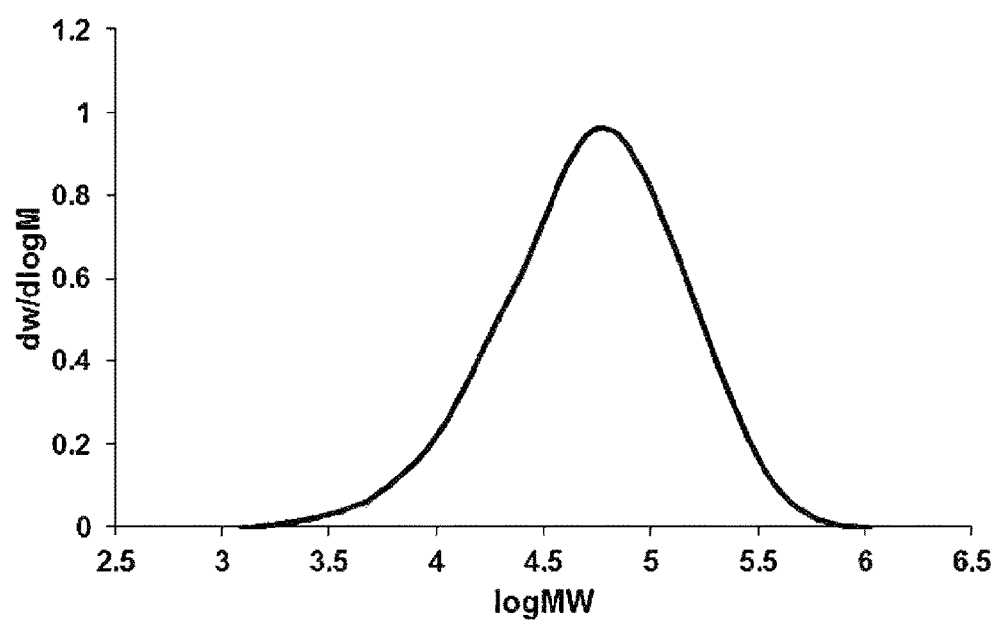
FIG. 5 illustrates a GPC analysis graph of an olefin-based polymer prepared in Example 1.

FIGS. 1 to 4 are illustrates a TREF graph of an olefin-based polymer prepared in Example 1 and 2, and Comparative Example 1 and 4, respectively. FIG. 5 illustrates a GPC analysis graph of an olefin-based polymer prepared in Example 1.

TABLE 1

| unit | Density g/cc | MI g/10 min | Mw g/mol | MWD | TREF Te1 ° C. (%) | TREF Te2 ° C. (%) | TREF Te3 ° C. (%) | number of TREF peak number | number of GPC number |
|---|---|---|---|---|---|---|---|---|---|
| Example 1 | 0.869 | 10 | 98525 | 2.34 | 0.5 (70%) | 41.4 (18%) | 89.0 (12%) | 3 | 1 |
| Example 2 | 0.867 | 24.5 | 64738 | 2.68 | −6.7 (58%) | 38.8 (22%) | 87.6 (20%) | 3 | 1 |
| Example 3 | 0.871 | 6.3 | 85088 | 2.60 | 0.3 (45%) | 41.0 (22%) | 88.0 (33%) | 3 | 1 |
| Example 4 | 0.873 | 1.7 | 103827 | 2.51 | −20.0 (44%) | 30.1 (14%) | 89.6 (42%) | 3 | 1 |
| Example 5 | 0.872 | 5.6 | 89932 | 2.51 | −20.0 (46%) | 24.9 (13%) | 88.9 (41%) | 3 | 1 |
| Comparative Example 1 | 0.871 | 27.9 | 62115 | 2.28 | 33.2 (100%) | — | — | 1 | 1 |
| Comparative Example 2 | 0.873 | 4.9 | 97635 | 2.31 | 34.8 (100%) | — | — | 1 | 1 |
| Comparative Example 3 | 0.872 | 1.1 | 100147 | 2.29 | 28.4 (100%) | — | — | 1 | 1 |
| Comparative Example 4 | 0.871 | 4.7 | 109031 | 2.55 | 1.4 (61%) | 65.6 (39%) | — | 2 | 1 |
| Comparative Example 5 | 0.864 | 30.7 | 72836 | 2.91 | −5.0 (84%) | 98.8 (16%) | — | 2 | 1 |

In the experimental results, Examples 1 to 5 according to the present invention exhibited three peak of Te1, Te2 and Te3 when measuring TREF in a density range of 0.850 g/cc to 0.910 g/cc. On the other hand, the polymers of Comparative Examples 1 to 5 showed only one or two peaks in the same density range.

In addition, the olefin-based polymers of Examples 1 to 5 according to the present invention exhibited a single peak in GPC, and exhibited a molecular weight distribution (MWD) of 2.3 to 2.7, which is a narrow molecular weight distribution comparable to that of the polymers of Comparative Examples 1 to 5.

The invention claimed is:

1. An olefin-based polymer which exhibits a single peak when analyzed by gel permeation chromatography, and satisfies the following requirements (1) to (4):
   (1) Density: from 0.850 g/cc to 0.910 g/cc
   (2) Melt index when measured under the conditions of 190° C. and 2.16 kg weight: from 0.1 g/10 min to 100 g/10 min, (3) Molecular weight distribution: from 1.5 to 4.0, and (4) Comprising three elution temperatures Te1, Te2 and Te3 of the olefin-based polymer in a temperature range from −20° C. to 120° C. when measuring temperature rising elution fractionation.

2. The olefin-based polymer of claim 1, wherein the Te1 is a relatively lower temperature than the Te2, and the Te2 is a relatively lower temperature than the Te3, when measuring temperature rising elution fractionation, and Te1 is in a range from −20° C. to 100° C.; Te2 is in a range from 0° C. to 120° C.; and Te3 is in a range from 20° C. to 120° C. in a density range from 0.850 g/cc to 0.910 g/cc of the olefin-based polymer.

3. The olefin-based polymer of claim 1, wherein the Te1 is in a range from −20° C. to 30° C.; the Te2 is in a range from 10° C. to 80° C.; and Te3 is in a range from 40° C. to 120° C. in a density range from 0.86 g/cc to 0.88 g/cc of the olefin-based polymer.

4. The olefin-based polymer of claim 1, wherein the olefin-based polymer comprises a first semi-crystalline olefin-based polymer, a second semi-crystalline olefin-based polymer and a third semi-crystalline olefin-based polymer, and a fraction ratio of a peak for the first semi-crystalline olefin-based polymer is 5% to 90%; a fraction ratio of a peak for the second semi-crystalline olefin-based polymer is 5% to 90%; and a fraction ratio of a peak for the third semi-crystalline olefin-based polymer is 5% to 90% when measuring TREF.

5. The olefin-based polymer of claim 1, wherein the olefin-based polymer comprises a first semi-crystalline olefin-based polymer, a second semi-crystalline olefin-based polymer and a third semi-crystalline olefin-based polymer, and a fraction ratio of a peak for the first semi-crystalline olefin-based polymer is 30% to 80%; a fraction ratio of a peak for the second semi-crystalline olefin-based polymer is 5% to 40%; and a fraction ratio of a peak for the third semi-crystalline olefin-based polymer is 5% to 50% when measuring TREF.

6. The olefin-based polymer of claim 1, which comprises three crystallization temperatures Tc1, Tc2 and Tc3, and the Tc1 is 5° C. or lower; Tc2 is in a range from 0° C. to 60° C.; and the Tc3 is in a range from 80° C. to 130° C. in a density range from 0.850 g/cc to 0.910 g/cc of the olefin-based polymer when measuring a differential scanning calorimetry.

7. The olefin-based polymer of claim 1, wherein melting index of the olefin-based polymer is from 0.1 g/10 min to 30 g/10 min when measured under the conditions of 190° C. and 2.16 kg weight.

8. The olefin-based polymer of claim 1, wherein weight average molecular weight of the olefin-based polymer is from 20,000 g/mol to 200,000 g/mol.

9. The olefin-based polymer of claim 1, wherein molecular weight distribution of the olefin-based polymer is from 1.5 to 3.0.

10. The olefin-based polymer of claim 1, wherein the olefin-based polymer is for hollow molding, extrusion molding or injection molding.

* * * * *